Oct. 25, 1960 D. E. HUNT 2,957,265
FISH LURE
Filed Aug. 31, 1953
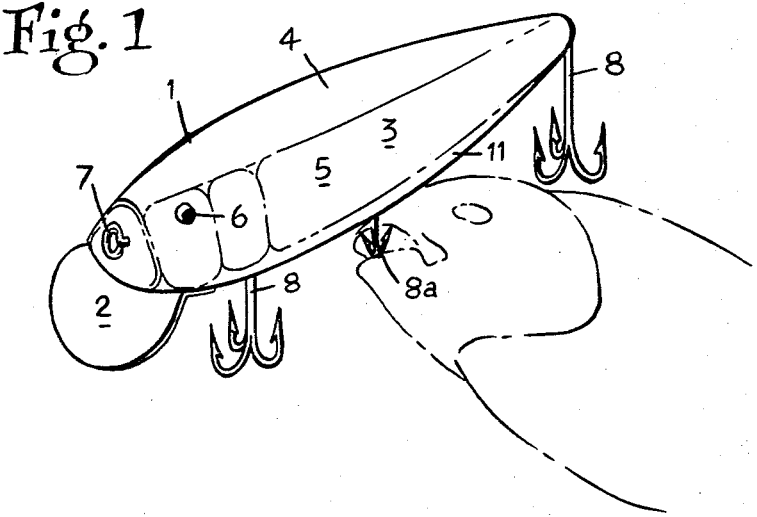
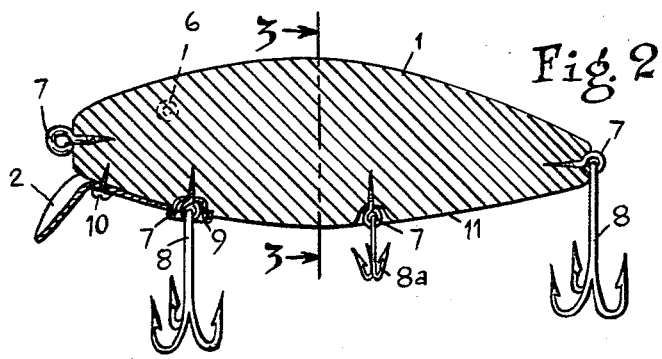
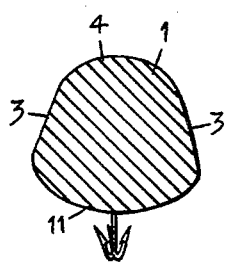
INVENTOR:
Dewey E. Hunt,
BY
Ralph P. Staubly,
ATTORNEY

2,957,265
Patented Oct. 25, 1960

2,957,265

FISH LURE

Dewey E. Hunt, American Hardware Co.,
Watertown, Tenn.

Filed Aug. 31, 1953, Ser. No. 377,376

8 Claims. (Cl. 43—42.47)

This invention relates to a fish lure, specifically an artificial bait of the "plug" type.

The basis of my invention is the appreciation of the following facts: (1) the initial strike is not a swallowing or eating operation, but rather is a crushing action designed to kill or immobilize the prey; (2) this is preparatory to a second seizure which is the swallowing operation; (3) the immobilizing bite is more like a strong "nibble" and therefore less likely to result in a deep hooking in the fish's mouth; (4) fish are quick to detect the artificial nature of the lure from the initial strike, and tend to avoid a second strike; (5) the initial strike usually is a bite applied centrally of the ventral portion of a minnow-shaped object.

The inventive concept derived from the above-mentioned facts, was the realization that the centrally located hook or set of hooks should be made smaller than would apparently be dictated by the mouth size of the fish for which the lure was designed. For on the first or initial strike the fish's mouth would not be opened for a swallowing operation but rather would be only partly open, being set or tensed for a quick killing bite. If this theory is correct, it should be found that the percentage of catches on initial strikes would be increased by a reduction in the size of the center set of hooks, because the partially opened mouth would bump, but would not engulf, hooks of normal size. The following statistics indicate the correctness of the theory: in thirteen hours of fishing using a plug substantially like the one shown in the drawing of this application (and approximately three inches long) and with the central set of hooks of the same size as the other sets of hooks, there were only seventeen catches out of fifty-six strikes; but when the central set of hooks was reduced in size approximately as shown in the drawing, in sixty-four hours of fishing there were one hundred one catches out of one hundred fourteen strikes. By this reduction in the size of the center set of hooks, the percentage of catches is increased from 31% to 88% on initial strikes. Surprisingly, this increase was not accompanied by a noticeable lowering of the average size of the catches.

It was also discovered that the use of shorter, as well as smaller, central hooks permitted the fish's head to come closer to the body of the lure before engagement, which resulted not only in a higher percentage of hooking by the small set of hooks, but also in a more frequent "snagging" of the fish by the front and rear sets of hooks.

As an additional valuable refinement, the centrally located small set of hooks is shaped so the lower extremities of the hooks define an arrow-head-shaped guide to further increase the first-strike catch-percentage, by guiding the set of hooks into the fish's mouth also in those inaccurate strikes where a rounded bottomed set would fail to enter.

*Objects of the invention*

It is an object of the invention to provide a plug-type fish-lure in which a very high percentage of the initial strikes will result in catches.

It is another object of the invention to provide a plug-type lure in which a small set of hooks is surrounded by larger hooks whereby the less secure (although much more frequent) hooking by the small set will be more than offset by a snagging-action on the part of the larger sets.

It is a further object of the invention to provide a lure which is life-like both in appearance and in its motion when pulled through the water, as will hereinafter appear from the detailed description below.

It is still another object to provide a minnow-type fish-lure having a downwardly pointed small set of hooks centrally of its under side for greatly increasing the percentage of catches on initial strikes.

*Figures of the drawing*

Fig. 1 is a perspective view of the lure from a point slightly forward of and above the same.

Fig. 2 is a longitudinal vertical axial cross-section.

Fig. 3 is a transverse cross-sectional view taken on the line 3—3 of Fig. 2.

*Detailed description*

The lure consists of a body 1 of wood or other material having sufficient buoyancy so that the lure as a whole will float when not in motion, but which with the assistance of the diving-lip or "wiggler" 2 will submerge when pulled at a desired fish-luring speed through the water. The general shape is that of a minnow. The upper portion of the body has slightly flattened sides 3 sloping upwardly and inwardly to a narrower dome-shaped top surface 4. The wide lower or belly surface 11 is rounded so as to produce a desirable rolling or rocking action when the lure is floating. The belly surface is preferably silver or other light color; and wing-like areas 5 on the sides are painted gold, or a color of medium brightness. Bead-like eyes 6 may be added. Screw-eyes 7 are provided for the attachment of the line and the sets of hooks 8 and 8a. Ferrules 9 may be placed around the screw-eyes, if desired. The diving lip 2 may be attached to the body proper by a screw 10 or by other suitable means.

The provision of smaller hooks 8a in the central portion of the lure, produces, in effect, an automatic adjustment of the size of hook to the size of the fish's mouth, since fish too small to take the normal-sized hooks would still be caught as they strike the small set in the mid-ventral region of the plug, while extremely large fish would be caught by either the small or the larger sets of hooks as they bite upon a more extended area of the bait. As pointed out in the introductory paragraphs, the set of hooks adjacent the medial ventral portion of the minnow (to which the immobilizing bite is usually applied) is made considerably (by at least 30%) smaller than the other sets of hooks, and is also located closer to the body of the lure. This construction increases the liklihood of its entering the tensed and partly open mouth of the fish. The other sets of hooks are of normal size and length, since they thus are made more effective for snagging, or for mouth-hooking when a swallowing-type bite is attempted. Also it should be noted that each set of multiple hooks is more or less of standard proportions; that is, each unit has a vertical dimension roughly approximating three times the width of each hook element therein. The conventional or normal sized hooks have vertical and horizontal dimensions respectively roughly equal to and half the average diameter of the body 1, and the abnormally sized hook has a length approximately half the maximum diameter of the body.

It should be noted that the central set of hooks 8a define a downwardly pointed arrow-head-shaped assembly that still further increases the percentage of catches by reducing the frequency of end-on bumping against the edge of the fish's mouth.

The almost perfect streamlined shape of the lure produces a very life-like swimming motion as it is pulled through the water. The blunt angle of the lip 2 gives both a good diving action and a realistic wobble to the moving bait. The rounded bottom-surface, as noted above, results in a gentle rolling of the lure when on the surface of the water.

It is to be understood that my invention is not limited to the exact size, number, or proportions of the several parts as shown, but is capable of considerable variation without departing from the spirit of the invention, as defined in the appended claims.

Having thus described the invention, I claim:

1. An artificial fish bait, comprising: an elongated buoyant body member, a plurality of fish-hook means spaced longitudinally along and attached thereto so as to hang below the under surface of said body member, certain of said fish-hook means being located toward the front and rear ends of said body member and being of conventional size, that is, having vertical and horizontal dimensions respectively roughly equal to and half the average diameter of said body, other of said fish-hook means being centrally located and being abnormally small for the size of said body member and as compared with said fish-hook means of conventional size, by at least thirty percent.

2. An artificial fish bait according to claim 1 and in which each of said fish-hook means comprises a plurality of hooks permanently joined along their shanks, with the hook portions thereof extending radially outwardly therefrom.

3. An artificial fish bait according to claim 1 and in which said body member is generally minnow-shaped, having a wide round belly, a narrower rounded top surface, and relatively flat sides.

4. An artificial fish bait according to claim 1 and additionally comprising an obtuse-angled diving and wobbling lip extending downwardly from the forward ventral region of said body member.

5. An artificial fish bait according to claim 1, said centrally located fish-hook means comprising at least three hooks having their shanks centrally located and joined together and having their hooked parts so shaped as to define together an arrow-head-shaped guide for improving the likelihood of entrance of said hook means into the mouth of a striking fish.

6. An artificial fish bait according to claim 1 and in which said small centrally located fish-hook means have much shorter shanks than said fish-hook means of conventional size, by at least thirty percent, whereby a fish's head may move upwardly into snagging relationship with said front and rear fish-hook means before contacting said centrally located fish-hook means.

7. An artificial fish bait according to claim 6 and in which said fish-hook means are swingably attached to said body member.

8. A plug-type fish lure, comprising: an elongated minnow-shaped body-member; a normal-sized multiple-hook unit swingably attached thereto so as to depend beneath the gill region thereof; a second multiple-hook unit of normal size swingably attached to and depending from the tail region of said body-member; and an abnormally small multiple-hook unit swingably attached to the under surface of said body-member approximately mid-way between said first and second multiple-hook units; each of said normal-sized multiple-hook units having a vertical dimension roughly approximating three times the width of each hook element therein; said abnormally small hook unit having a length roughly approximating three times the width of each hook element therein; said abnormally small hook unit having a length roughly approximating half that of said normal-sized hook units and half the maximum diameter of said body-member, whereby said abnormally small multiple-hook unit can relatively easily enter the mouth of a fish when opened only wide enough to apply an immobilizing bite to the central ventral portion of said body-member.

References Cited in the file of this patent

UNITED STATES PATENTS

| | | |
|---|---|---|
| D. 59,770 | Piggot | Nov. 22, 1921 |
| 810,017 | Ackerman | Jan. 16, 1906 |
| 1,483,842 | Carter | Feb. 12, 1924 |
| 2,077,630 | Lane | Apr. 20, 1937 |